United States Patent
Kuhn et al.

(10) Patent No.: US 12,169,027 B2
(45) Date of Patent: Dec. 17, 2024

(54) DEVICE FOR REGULATING PRESSURES OF A FLOW MEDIUM USING A VALVE

(71) Applicant: Schaeffler Technologies AG & Co. KG, Herzogenaurach (DE)

(72) Inventors: Lukas Kuhn, Puschendorf (DE); Horst Hartmann, Aurachtal (DE); Anton Erhardt, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/781,770

(22) PCT Filed: Nov. 9, 2020

(86) PCT No.: PCT/DE2020/100958
§ 371 (c)(1),
(2) Date: Jun. 2, 2022

(87) PCT Pub. No.: WO2021/115527
PCT Pub. Date: Jun. 17, 2021

(65) Prior Publication Data
US 2023/0010656 A1    Jan. 12, 2023

(30) Foreign Application Priority Data
Dec. 10, 2019 (DE) .................. 102019133667.8

(51) Int. Cl.
*F16K 17/04* (2006.01)
*F16K 15/06* (2006.01)
*F16K 31/122* (2006.01)

(52) U.S. Cl.
CPC ........ *F16K 17/0466* (2013.01); *F16K 15/063* (2013.01); *F16K 31/1221* (2013.01); *Y10T 137/7925* (2015.04)

(58) Field of Classification Search
CPC ............. F16K 17/0466; F16K 27/0209; F16K 15/063; F16K 15/025; F16K 27/041;
(Continued)

(56) References Cited

U.S. PATENT DOCUMENTS 620,936 A * 3/1899 Kunzer ................. F16K 15/065
137/542
910,711 A * 1/1909 McCarty ............... F16K 15/026
137/543.23
(Continued)

FOREIGN PATENT DOCUMENTS

CN 101025139 A * 8/2007 ......... F02M 63/0225
CN 103629042 A    3/2014
(Continued)

OTHER PUBLICATIONS

Parker Oring handbook (Year: 2021).*

*Primary Examiner* — Craig J Price
(74) *Attorney, Agent, or Firm* — Volpe Koenig

(57) ABSTRACT

A device for controlling pressures of a flow medium in a component in which the device is formed at least by the component and at least one valve; the valve has an axially oriented valve axis and is seated, at least in part, in the component and has at least one opening. The opening leads into an annular gap which at least partly surrounds the valve, and the annular gap is formed between the valve and the component. The annular gap is sealed by at least one seal.

13 Claims, 2 Drawing Sheets

(58) Field of Classification Search
CPC .............. F16K 31/1221; F16K 15/206; F16H 57/0435; F16H 2007/0859; F16H 2061/0065; F16H 61/4017; F16H 61/0276; Y10T 137/7504; Y10T 137/7925; F16J 15/02; F16J 15/021; F16J 15/06; F16J 15/10; G05D 16/103; F02C 7/232; F02C 9/263
USPC .............. 137/538, 540, 535, 543.17, 543.13; 277/590–654; 474/109–111
See application file for complete search history.

(56) References Cited

U.S. PATENT DOCUMENTS

| | | | | |
|---|---|---|---|---|
| 939,987 | A * | 11/1909 | Dawley | F16K 15/026 251/366 |
| 1,029,464 | A * | 6/1912 | Ruwell | F16K 17/0433 137/514.7 |
| 1,150,743 | A | 8/1915 | Butts | |
| 1,599,716 | A | 9/1926 | Replogle | |
| 1,664,043 | A * | 3/1928 | Pierre | F16K 1/44 137/625.36 |
| 1,710,635 | A | 4/1929 | Wertz | |
| 2,047,185 | A * | 7/1936 | Ballard | A43D 25/063 137/538 |
| 2,085,982 | A | 7/1937 | Johnson | |
| 2,143,399 | A * | 1/1939 | Abercrombie | F04B 53/1087 137/906 |
| 2,182,278 | A * | 12/1939 | Brauer | E21B 21/10 137/902 |
| 2,279,002 | A * | 4/1942 | Macneil | F16K 15/02 137/454.2 |
| 2,304,991 | A * | 12/1942 | Foster | F04B 53/1027 417/454 |
| 3,054,422 | A * | 9/1962 | Napolitano | F16K 1/385 277/648 |
| 3,103,950 | A * | 9/1963 | Gulick | G05D 7/0133 137/538 |
| 3,303,831 | A * | 2/1967 | Sherman | F02B 75/044 137/538 |
| 3,339,574 | A * | 9/1967 | Erb | F02C 7/232 137/107 |
| 3,366,138 | A * | 1/1968 | Graham | F16K 15/026 137/538 |
| 3,995,658 | A * | 12/1976 | Hager | F16K 15/063 137/543 |
| 4,039,003 | A * | 8/1977 | Cheek | F16K 15/025 137/454.6 |
| 4,161,189 | A * | 7/1979 | Mueller, Jr. | F16K 17/04 137/538 |
| 4,245,781 | A * | 1/1981 | Sliger | G05D 23/1333 137/454.2 |
| 4,265,271 | A * | 5/1981 | Rosaen | F16K 17/06 137/542 |
| 4,657,043 | A * | 4/1987 | Ampferer | F01M 1/16 137/538 |
| 4,682,531 | A * | 7/1987 | Mayer | F15B 13/02 91/468 |
| 4,718,450 | A * | 1/1988 | Ezekoye | F16K 47/08 137/538 |
| 4,766,924 | A * | 8/1988 | Lee, III | F16K 1/126 137/540 |
| 4,846,216 | A * | 7/1989 | Raymond | F16K 3/246 251/368 |
| 4,876,857 | A * | 10/1989 | Feltz | F02C 9/263 137/538 |
| 4,936,339 | A * | 6/1990 | Bennett | F16K 15/025 137/454.6 |
| 5,052,433 | A * | 10/1991 | Levenez | F15B 11/068 137/513.3 |
| 5,193,579 | A * | 3/1993 | Bauer | F16N 23/00 137/540 |
| 5,653,256 | A * | 8/1997 | Myers | F16K 15/063 137/454.2 |
| 5,906,352 | A * | 5/1999 | Post | F16K 27/029 251/44 |
| 6,019,125 | A * | 2/2000 | Reverberi | F04B 53/1027 137/454.6 |
| 6,152,171 | A * | 11/2000 | Messick | F16K 15/063 137/543.13 |
| 6,234,194 | B1 * | 5/2001 | Jainek | F16K 15/026 137/543.13 |
| 6,435,848 | B1 * | 8/2002 | Minami | F04B 27/1804 137/538 |
| 7,228,869 | B2 * | 6/2007 | Wilhelm | F16K 17/0433 137/540 |
| 7,322,373 | B2 * | 1/2008 | Lewis | G05D 16/187 137/538 |
| 7,389,791 | B2 * | 6/2008 | Fangmeier | F16K 15/063 137/542 |
| 7,581,560 | B2 * | 9/2009 | Koch | F16K 15/028 137/513.5 |
| 7,631,656 | B2 * | 12/2009 | Hoffman | F16K 15/063 137/454.2 |
| 8,043,186 | B2 * | 10/2011 | Gresley | F16H 61/0276 475/161 |
| 8,276,613 | B2 * | 10/2012 | Park | F16K 15/026 137/516.25 |
| 8,276,614 | B2 * | 10/2012 | Park | F04B 53/001 137/540 |
| 8,671,976 | B2 * | 3/2014 | Park | F04B 27/1009 137/543.19 |
| 8,833,389 | B2 * | 9/2014 | Dziurda | F16K 15/044 137/454.2 |
| 9,004,099 | B2 * | 4/2015 | Kim | F16K 15/025 137/513.5 |
| 9,470,295 | B2 * | 10/2016 | Emizu | F01L 1/024 |
| 9,555,350 | B2 * | 1/2017 | Ardes | B01D 35/1475 |
| 9,745,928 | B2 | 8/2017 | Honda | |
| 10,082,137 | B2 * | 9/2018 | Graham | F04B 53/10 |
| 10,591,074 | B2 * | 3/2020 | Horváth | F16K 15/026 |
| 10,648,580 | B2 * | 5/2020 | Jeon | F16K 15/063 |
| 10,767,773 | B2 * | 9/2020 | Lee | B60T 17/04 |
| 10,844,853 | B2 * | 11/2020 | Yoon | F04B 27/1804 |
| 10,851,904 | B2 * | 12/2020 | Jeon | B60T 17/04 |
| 11,126,209 | B1 * | 9/2021 | Weingarten | F16K 17/0473 |
| 11,156,304 | B2 * | 10/2021 | Kang | F16K 15/025 |
| 11,261,982 | B2 * | 3/2022 | Patterson | F16K 17/048 |
| 11,293,421 | B2 * | 4/2022 | Sung | F04B 27/08 |
| 11,466,789 | B2 * | 10/2022 | Kuhn | F16H 57/0435 |
| 11,808,367 | B2 * | 11/2023 | Kuhn | F16K 15/026 |
| 11,982,367 | B2 * | 5/2024 | Kuhn | F16K 15/063 |
| 12,044,330 | B2 * | 7/2024 | Kuhn | F16K 31/1221 |
| 2003/0090069 | A1 | 5/2003 | Keck | |
| 2003/0122322 | A1 | 7/2003 | Tremoulet, Jr. et al. | |
| 2005/0103385 | A1 | 5/2005 | Takahashi | |
| 2006/0037647 | A1 | 2/2006 | Okuda et al. | |
| 2008/0265520 | A1 | 10/2008 | Kurth | |
| 2011/0076171 | A1 | 3/2011 | Park et al. | |
| 2011/0139273 | A1 | 6/2011 | Park et al. | |
| 2014/0166138 | A1 * | 6/2014 | Bisig | B23P 11/00 29/890.12 |
| 2014/0311585 | A1 * | 10/2014 | Rickis | F16K 15/025 137/538 |
| 2015/0211500 | A1 | 7/2015 | Kumazawa et al. | |
| 2016/0258308 | A1 | 9/2016 | Davis et al. | |
| 2017/0159834 | A1 * | 6/2017 | Jeon | F16K 1/46 |
| 2017/0328316 | A1 | 11/2017 | Van Lant et al. | |
| 2022/0325810 | A1 * | 10/2022 | Morris | F16K 15/026 |

FOREIGN PATENT DOCUMENTS

| | | |
|---|---|---|
| CN | 203948754 | 11/2014 |
| CN | 204437302 U | 7/2015 |
| CN | 207093833 U | 3/2018 |
| CN | 107883051 | 4/2018 |
| DE | 2805040 | 8/1979 |
| DE | 3719354 | 12/1988 |
| DE | 8817172 | 10/1993 |

(56) References Cited

FOREIGN PATENT DOCUMENTS

| | | |
|---|---|---|
| DE | 19731557 | 1/1999 |
| DE | 10030250 | 8/2001 |
| DE | 10259205 | 7/2004 |
| DE | 10358429 | 7/2005 |
| DE | 102005025917 | 12/2006 |
| DE | 102006010706 A1 | 9/2007 |
| DE | 102007035706 | 8/2008 |
| DE | 102009022334 A1 | 12/2010 |
| DE | 102009025092 | 12/2010 |
| DE | 112016004837 | 7/2018 |
| EP | 0798471 | 10/1997 |
| EP | 3584475 | 12/2019 |
| FR | 1275199 | 11/1961 |
| JP | 2014181765 | 9/2014 |
| JP | 6273093 | 1/2018 |
| WO | 9533231 | 12/1995 |
| WO | 03095875 A1 | 11/2003 |
| WO | 2020114550 | 6/2020 |
| WO | 2021018341 | 2/2021 |
| WO | 2021115521 | 6/2021 |
| WO | 2022002302 | 1/2022 |

\* cited by examiner

DEVICE FOR REGULATING PRESSURES OF A FLOW MEDIUM USING A VALVE

CROSS-REFERENCE TO RELATED APPLICATIONS

This application is the U.S. National Phase of PCT Appln. No. PCT/DE2020/100958, filed Nov. 9, 2020, which claims priority from German Patent Application No. DE 10 2019 133 667.8, filed Dec. 10, 2019, the entire disclosures of which are incorporated by reference herein.

TECHNICAL FIELD

The disclosure relates to a device for controlling pressures of a flow medium in a component, wherein the device is formed by the component and a valve, and the valve has an axially oriented valve axis and is seated, at least in part, in the component and has at least one opening.

BACKGROUND

Such a device is described in JP 2014 181765 A. A valve consists of a housing, a piston with a ball, a compression spring and a support element. The piston is movable towards and away from the valve seat towards the end of the valve by means of the compression spring. One opening is formed at the front end of the valve seat and a second opening at the rear of one end of the valve. The valve is seated with the housing in a component. The seat of the valve is sealed at the front and rear ends with a sealing ring clamped between the valve housing and the housing. When the piston or when the ball lifts off the valve seat, there is a continuous passage for a flow medium between a first channel opening into the first opening at the front and a second channel leading away from the end at the rear of the valve.

A further valve is disclosed in DE 10 2007 035 706 A1. The valve housing of this valve is an essentially sleeve-shaped sheet metal component produced by a non-cutting production method, just like the outer piston skirt of the piston. Two compression springs and a ball are installed in the valve. The outer piston skirt of the piston abuts a valve seat of the valve housing. Another sealing seat for the ball is formed in the piston skirt. When the valve is in a balanced state, the ball is biased axially against this sealing seat by means of a compression spring. The compression spring is supported axially towards one end of the outlet on an inner piston. Towards the other side, the inner piston is supported in the direction of the end of the valve via a further compression spring on a support element. The support element is firmly seated within the valve housing.

SUMMARY

The object of the disclosure is to create a device and a valve that can be used in a variety of applications.

The object is achieved by a device with one or more of the features described herein.

The device according to the disclosure for controlling pressures of a flow medium in a component is formed by at least the component and a valve. The component is a shaft, alternatively a hub, a housing or any other component, preferably of a vehicle transmission. The valve is preferably designed to be rotationally symmetrical and has an axially oriented valve axis. The valve is either fully or partially seated in the component. The valve can therefore also be arranged in two components, preferably of a vehicle transmission, that are adjacent to one another, arranged one inside the other, or two components that are connected to one another or are located opposite one another. The valve has at least one opening. Alternatively, two, three or more openings are provided distributed around the circumference of the valve. The opening opens, or the openings open, into an annular gap at least partially surrounding the valve. The annular gap is formed at a radial distance from the outer contour of the valve. It runs about the valve axis and is preferably greater than the radial wall thicknesses of the valve housing of the valve. The openings are preferably formed in one or more valve housings of the valve, which are operatively connected to one another. The annular gap is formed between the valve and the component. The annular gap is sealed with at least one seal. In contrast to the known prior art, the valve is provided with one or more openings, which open into an annular gap, and has at least one seal with which the annular gap is sealed.

Typically, the passage of flow medium is axial. This means that the flow medium flows into an opening on the front end of the valve and leaves the valve again at the rear end. For example, the flow medium is oil, preferably transmission fluid. However, there are also devices in which the pressures of the flow medium or the flow direction of the flow medium between a longitudinal and a transverse channel need to be regulated. This means that the valve has one longitudinal opening and at least one transverse opening. In this case, transverse means seen in the radial direction on the axially oriented valve axis. The assembly of such valves in the device or in the component is relatively complicated, since the transverse opening must be precisely oriented with respect to the transverse channel. The problem here is that even a slight unintentional rotation of the valve about its own axis can create a circumferential offset between the passage cross-sections of the opening and the channel and there is therefore a risk that not enough flow medium can pass through.

Means must therefore be found to precisely align the valve in its position during assembly so that the flow cross-sections of the transverse channel match the transversely oriented opening in the valve.

By creating an annular gap about the valve in the region of the transversely oriented openings, position-oriented assembly is advantageously no longer necessary. The flow medium first leaves the valve via one or more openings and is collected in the annular channel; only then is it fed into one or more transverse channels. The corresponding transverse channel can then open into the annular channel at any desired point, and even axially offset relative to the transversely oriented opening. Such an annular gap is created, for example, in that the through-hole is provided on the inside with a seat for the valve and from the seat the through-hole is radially widened in the region of the transverse openings. Alternatively, however, the valve, as provided by an embodiment of the disclosure, is designed with a stepped diameter. A seat section and a guide section are designed on the valve housing. The diameter of the seat section is larger than that of the guide section, resulting in a diameter step on the valve housing. The through-hole in the component, which also extends axially over the guide section, has the same nominal dimension as the outside of the seat section of the valve housing. This creates the annular gap on the peripheral side around the guide section. Accordingly, the through-hole can easily be drilled as a through-bore. The through-hole or through-bore is defined as being continuous with the same diameter over at least an axial length in one direction, which corresponds to the length of the valve having the seat section and the guide section in the same axial direction.

According to one embodiment, the seal is formed at least from a sealing ring and a reinforcement. In this case, at least part of the reinforcement covers/overlaps the annular gap either completely or in part in the radial direction, i.e., oriented transversely to the valve axis. Therefore, firstly, the reinforcement can advantageously form a gap seal between the valve and an inner contour of a component and secondly, the seal, whose preferably sealing main component is a more or less elastically flexible element, is rigidly supported by the reinforcement. The elastic element is, for example, a sealing ring made of any desired sealing material, for example an elastomer. The sealing ring can also consist of one or more sealing lips and/or can be formed from one or more different materials. A further advantage of the reinforcement is that the reinforcement can be used both as a base and as a support for different types of seals. Since the valve cannot always be supported in a blind hole or on an annular shoulder, the annular gap between the valve and a hole with the valve seat is relatively wide. Accordingly, the seal must also be generously radially dimensioned. Since the seal is essentially made of elastic material, it can be the case that at high pressures of the flow medium it deforms flexibly and loses its sealing effect or even slips into the annular gap. The reinforcement according to the disclosure prevents this. In addition, bores with blind holes or annular shoulders are relatively expensive to produce, especially when seats for such valves have to be ground on the inside.

The reinforcements are easy to produce, particularly in bulk, at a low cost. They can be made of sheet metal or, alternatively, of plastic. One embodiment provides that the reinforcement is designed to be rotationally symmetrical about the valve axis. A further embodiment provides that the reinforcement has a leg viewed in a longitudinal section along the valve axis and extending radially outwards in the direction away from the valve axis. This results in the leg being formed by an annular disc section which is oriented concentrically to the valve axis and runs about the valve axis. This annular disc section radially covers the annular gap completely or in part. The sealing ring is supported axially on this annular disc section and, despite its flexible property, is held in position even at high pressures. The advantage of this embodiment is that the radial dimensions of the annular gap can be of any size. Only the radial length of the leg (the radial dimension of the annular disc section) has to be adjusted.

One embodiment provides that the reinforcement has a hollow-cylindrical collar. This collar is formed integrally with the leg. The reinforcement is placed with this collar on a neck of the valve or guided around it and therefore guided radially on the valve. The also hollow-cylindrical neck surrounds, for example, an inlet opening of the valve. The seal is guided radially over the collar on the neck and the leg or annular disc section extends radially away from the collar beyond the outer contour of the valve at this point and into the annular gap. The sealing ring of the seal is attached to the annular disc section or is axially supported on it and thus seals the annular gap.

A valve for a device according to the disclosure is also provided, which is provided with at least one piston which is guided in the valve housing. In addition, by means of a spring the piston can be axially biased against a sealing seat of the valve housing or against a sealing seat inserted separately into the valve housing. The spring is supported axially on a support element of the valve. The piston is guided in the valve housing so that it can move axially in order to control the passage cross-sections of the openings.

The valve can be preassembled with the device according to the disclosure to form an assembly. In this case, the collar is advantageously pressed onto a neck of the valve or onto the valve housing at another point. Such an assembly reduces the effort involved in transporting and storing the valve or the seal.

BRIEF DESCRIPTION OF THE DRAWINGS

In the following, the disclosure is explained in more detail with reference to exemplary embodiments. In the figures.

DETAILED DESCRIPTION

Figure 1:
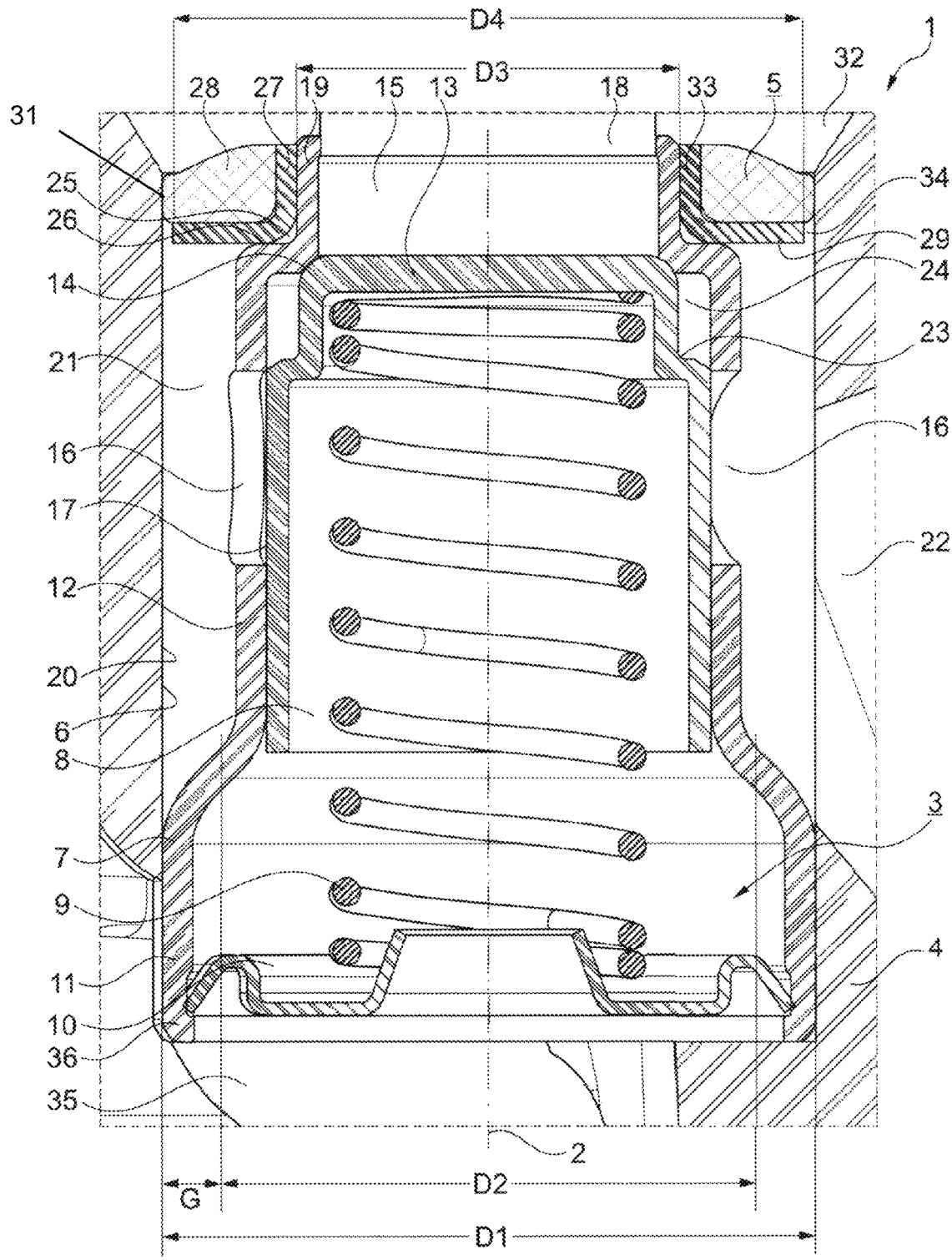
FIG. 1—shows a device 1 for regulating the pressure of a flow medium in a longitudinal section along the valve axis 2 of a valve 3.

Referring to FIG. 1, the device 1 is formed from a component 4 only partially shown, the valve 3 and a seal 5. The valve 3 is seated in a through-hole 6 of the component 4. The component 4 is, for example, a transmission housing or a rotating component of a transmission and is made, for example, of an aluminum alloy or alternatively of steel.

The valve 3 consists of a valve housing 7, a piston 8, a compression spring 9 and a support element 10. The valve axis 2 is axially oriented. Radial means transverse to the valve axis 2. The valve housing 7 has a seat section 11 with which the valve 3 sits centered in the through-hole 6 of the component 4. The piston 8 is guided axially in a guide section 12 of the valve housing 7. The support element 10 is seated firmly in the valve housing 7 at the end of the valve housing 7. The compression spring 9 is axially supported on a piston head 13 of the piston 8 and axially elastically clamped between the piston head 13 and the support element 10. As shown in FIG. 1, the piston 8 is in a closed position and biased against a valve seat 14 by the effect of the compression spring 9. In this closed position, a frontal first opening 15 of the valve housing 7 is closed by means of the piston 8. The first opening 15 is axially oriented with the valve axis 2 in the same way.

Second openings 16, which lie radially opposite a piston skirt 17 of the piston 8, are formed in the valve housing 7. The second opening 16 is oriented radially towards the valve axis 2, transversely to the axial direction. A first channel 18 and the first opening 15 are in alignment with one another so as to be permeable to a flow medium. The first opening 15 is surrounded by a neck 19 formed on the valve housing 7. The guide section 12 of the valve housing 7 extends axially from the seat section 11 to the neck 19. Depending on the design of the valve 3, a third channel 35 optionally connects to the valve 3 at the end 36.

An annular gap 21 running about the valve housing 7 and thus about the valve axis 2 is formed radially between the guide section 12 and an inner skirt surface 20 of the through-hole 6. The thickness G of the annular gap 21 results from the difference between the diameters D1 and D2, D1 being the diameter of the through-hole 6 designed as a through bore at the seat of the seat section 11 in the through-hole 6. The through-hole 6 can have other diameters at other points. D2 is the outer diameter of the guide section 12. The second openings 16 open into the annular gap 21. A second channel 22 leads into the annular gap 21. The outer diameter of the seat section 11 and the inner diameter D1 of the through-hole 6 are at least partially the same in the region of the seat section 11 in the nominal dimension, wherein a diameter difference optionally results from a clearance or transition fit or from a press fit between the seat section 11 and the through-hole 6.

The piston 8 is a hollow-cylindrical component which is designed with a stepped diameter. The first step 23 of the piston 8 is formed between the piston skirt 17 and the piston head 13. The piston head 13 has a smaller diameter than the piston skirt 17, so that an annular channel 24 is formed at the step 23 inside the valve 3. The annular channel 24 is formed between the first opening 15 and the second openings 16.

The outer diameter D3 of the neck 19 is smaller than the outer diameter D2 of the guide section 12 so that a second step 25 is formed on the valve housing 7. The seal 5 is guided radially on the neck 19 via a reinforcement 27 of the seal 5 and is supported axially on an annular surface 26 of the step 25. The seal 5 also consists of at least one sealing ring 28. The reinforcement 27 and the sealing ring 28 are either firmly connected to one another, for example by vulcanization, or the sealing ring 28 lies axially on the radially oriented leg 29 of the reinforcement 27. The outer diameter D4 of the reinforcement 27 determined by the outer edge of the disc-shaped leg 29 is smaller than or equal to the inner diameter D2 of the through-hole 6 at the point where the valve 2 with the seat section 11 is seated in the through-hole 6. In addition, the outer diameter D4 of the reinforcement 27 is larger than the outer diameter D2 of the guide section 12. This results in the following relationship: $D2 < D4 \leq D1$. The reinforcement 27 is rigidly radially guided via a collar 33 on the neck 19 and at the same time is rigidly supported with the leg 29 on the annular surface 26 and protrudes radially with the leg 29 over the outer lateral surface 30 of the valve housing 7 and at the same time radially bridges the annular gap 21 at least in part. The collar 33 is designed as a hollow cylinder and is connected to the leg 29 to form the reinforcement 27 as one piece from one material. The sealing ring 28 is squeezed radially in between the collar 33 and an inner skirt surface 31 of the through-hole 6 and is clamped in axial directions between a cover 32 and the leg 29.

If necessary, the sealing ring 28 also bridges a gap 34 formed between the leg 29 and the inner skirt surface 31. The sealing ring 28 is supported axially in the direction of the annular gap 21 by the leg 29 in such a way that it securely comes to lie against the inner skirt surface 31 and does not become drawn into or does not fall into the annular gap 21, thus losing its sealing effect.

Figure 2:
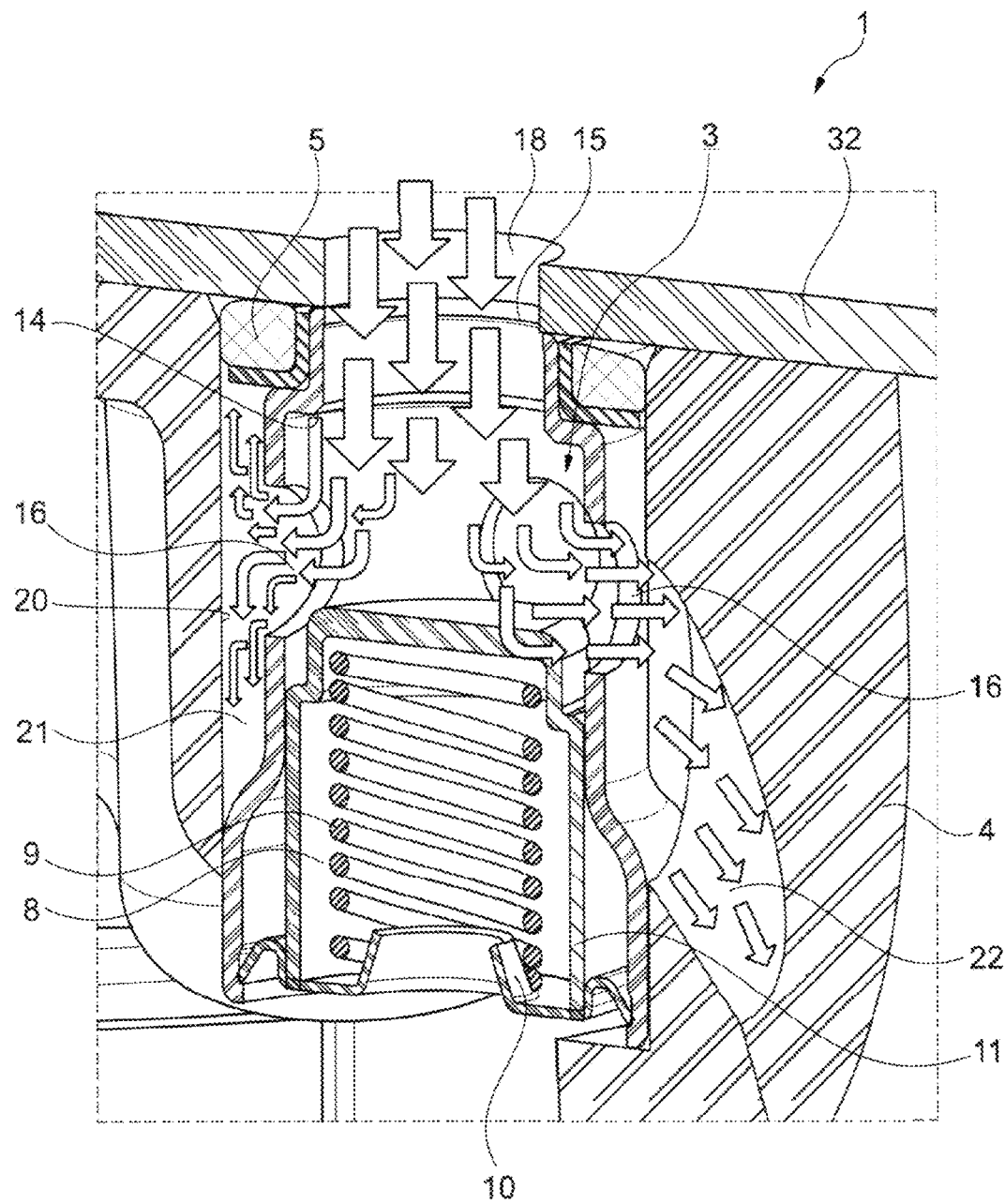
FIG. 2—a sectioned 3-dimensional view of the device according to FIG. 1.

In FIG. 2, the piston 8 is in an open position. The flow medium symbolized by the arrows is initially in the first channel 18 under pressure in the closed position shown in FIG. 1 against the piston 8. If the pressure exceeds a certain limit value, the piston 8 lifts off the valve seat 14 and is displaced axially in the direction of the support element 10 against the effect of the compression spring 9. The first opening 15 is released. The flow medium passes through the interior of the valve 3 and leaves it via the second openings 16, where it then flows into the annular gap 21 formed between the inner skirt surface 20 and the valve 3 and from there into the second channel 22. The annular gap 21 is sealed (closed off) axially in one direction on the front end of the valve 3 by means of the seal, so that no flow medium can escape between the cover 32 and the housing of the component 4 and is closed off within the component 4 in the other direction by the seat of the seat section 11 of the valve housing 7.

LIST OF REFERENCE SYMBOLS

1 Device
2 Valve axis
3 Valve
4 Component
5 Seal
6 Through-hole in the component
7 Valve housing
8 Piston
9 Compression spring
10 Support element
11 Seat section of the valve body
12 Guide section of the valve body
13 Piston head of the piston
14 Valve seat
15 First opening
16 Second opening
17 Piston skirt of the piston
18 First channel
19 Neck
20 Inner skirt surface of the through-hole
21 Annular gap
22 Second channel
23 Step of the piston
24 Annular channel
25 Step of the valve body
26 Annular surface
27 Reinforcement of the seal
28 Sealing ring of the seal
29 Reinforcement legs
30 Outer skirt surface of the valve
31 Inner skirt surface of the through-hole
32 Cover
33 Collar of the reinforcement
34 Gap
35 Third channel
36 End of the valve

The invention claimed is:

1. A device for controlling pressures of a flow medium, the device comprising:
   a component;
   a valve having an axially oriented valve axis that is seated at least in part in the component and has at least one opening, wherein the at least one opening opens into an annular gap which at least partly surrounds the valve; the annular gap is formed between the valve and the component; and
   at least one seal positioned between the valve and the component that seals the annular gap, the seal being formed from at least one sealing ring and a reinforcement that is a separate component from the valve, the reinforcement including a leg at least partially radially overlapping the annular gap and a hollow-cylindrical collar which is formed in one piece with the leg;
   wherein the hollow-cylindrical collar is guided radially on an axially extending hollow-cylindrical neck of the valve, the hollow-cylindrical neck is oriented axially in a direction of a first channel, the hollow-cylindrical neck is formed on the valve about the valve axis, and the hollow-cylindrical neck delimits a first opening of the valve.

2. The device according to claim 1, wherein at least part of the reinforcement covers the annular gap at least partly in a radial direction oriented transverse to the valve axis.

3. The device according to claim 2, wherein the valve has a valve housing with the at least one opening, the valve housing extends about the valve axis, the annular gap extends around the valve housing concentrically with respect to the valve axis and is formed at least in sections between the valve housing and an inner skirt surface of a through-hole, the through-hole is formed at least in sections in the component and extends at least axially over an entire length of the valve.

4. The device according to claim 3, wherein the reinforcement is configured to be rotationally symmetrical about the valve axis, and the at least one sealing ring of the seal is supported axially by the leg axially closes the annular gap running axially parallel to the valve axis.

5. The device according to claim 1, wherein the neck surrounds the first opening of the valve, and the first channel and the first opening are connected to one another so as to be permeable to a flow medium.

6. The device according to claim 1, wherein the annular gap is connected to a second channel so as to be permeable to a flow medium.

7. The device according to claim 1, wherein the annular gap is closed in one axial direction by the seal and in another opposite axial direction by a seat of the valve in the component.

8. The device according to claim 1, wherein the annular gap is closed at a second axial end by a seat of the valve in the component.

9. A device for controlling pressures of a flow medium, the device comprising:
   a component;
   a valve having an axially oriented valve axis that is seated at least in part in the component and has a first opening and a second opening, wherein the first opening opens into an annular gap formed between the valve and the component that at least partly surrounds the valve; and
   at least one seal positioned between the valve and the component, the seal being formed from at least one sealing ring and a reinforcement that is a separate component from the valve, the reinforcement including a leg that partially radially overlaps the annular gap such that the leg is radially offset from an inner surface of the component at an axial location of the leg, and the at least one sealing ring seals the annular gap formed between the leg and the inner surface of the component;
   wherein at least part of the reinforcement covers the annular gap at least partly in a radial direction oriented transverse to the valve axis, and the valve has a valve housing with the first opening defined radially therethrough, the valve housing extends about the valve axis, the annular gap extends around the valve housing concentrically with respect to the valve axis and is formed at least in sections between the valve housing and an inner skirt surface of a through-hole, which is formed at least in sections in the component and extends at least axially over an entire length of the valve.

10. The device according to claim 9, wherein the reinforcement is configured to be rotationally symmetrical about the valve axis, and the sealing ring of the seal is supported axially by the leg and axially closes the annular gap running axially parallel to the valve axis.

11. The device according to claim 9, wherein the reinforcement has a hollow-cylindrical collar which is formed in one piece with the leg and is guided at least radially on a hollow-cylindrical neck oriented axially in a direction of a first channel, formed on the valve about the valve axis and wherein the hollow-cylindrical neck delimits a first opening of the valve.

12. The device according to claim 11, wherein the neck surrounds the first opening of the valve, and the first channel and the first opening are connected to one another so as to be permeable to a flow medium.

13. The device according to claim 11, wherein the annular gap is connected to a second channel so as to be permeable to a flow medium.

\* \* \* \* \*